US012762867B2

(12) United States Patent
Kagimoto et al.

(10) Patent No.: US 12,762,867 B2
(45) Date of Patent: Oct. 13, 2026

(54) DIVIDING LINE RECOGNITION DEVICE

(71) Applicant: HITACHI ASTEMO, LTD., Hitachinaka (JP)

(72) Inventors: Kento Kagimoto, Hitachinaka (JP); Hitoshi Hayakawa, Hitachinaka (JP); Shunsuke Matsuo, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 360 days.

(21) Appl. No.: 18/254,637

(22) PCT Filed: Sep. 21, 2021

(86) PCT No.: PCT/JP2021/034493
§ 371 (c)(1),
(2) Date: May 26, 2023

(87) PCT Pub. No.: WO2022/130720
PCT Pub. Date: Jun. 23, 2022

(65) Prior Publication Data

US 2024/0005673 A1 Jan. 4, 2024

(30) Foreign Application Priority Data

Dec. 16, 2020 (JP) ................................ 2020-208174

(51) Int. Cl.
*G06V 20/56* (2022.01)
*B60W 60/00* (2020.01)
(Continued)

(52) U.S. Cl.
CPC ......... *G06V 20/588* (2022.01); *B60W 60/001* (2020.02); *G06T 7/70* (2017.01); *B60W 2552/53* (2020.02); *G06T 2207/30256* (2013.01)

(58) Field of Classification Search
CPC .............. G06V 20/588; B60W 60/001; B60W 2552/53; G06T 7/70; G06T 2207/30256;
(Continued)

(56) References Cited

U.S. PATENT DOCUMENTS

| | | | | |
|---|---|---|---|---|
| 8,477,999 B2 * | 7/2013 | Nishida | G05D 1/0244 382/104 |
| 10,248,124 B2 * | 4/2019 | Bellaiche | G01C 21/3658 |

(Continued)

FOREIGN PATENT DOCUMENTS

| | | |
|---|---|---|
| JP | 2010-221909 A | 10/2010 |
| JP | 2015-001773 A | 1/2015 |

(Continued)

OTHER PUBLICATIONS

International Search Report with English Translation and Written Opinion of International Patent Application No. PCT/JP2021/034493 dated Nov. 16, 2021 (9 pages).

*Primary Examiner* — Gregory A Morse
*Assistant Examiner* — Ronde Lee Miller
(74) *Attorney, Agent, or Firm* — Foley & Lardner LLP

(57) ABSTRACT

A dividing line recognition device includes a controller that acquires dividing line information around an own vehicle detected by a dividing line detection sensor, acquires target information around the own vehicle detected by a target detection sensor, and estimates a state of another vehicle on a basis of the target information. The controller recognizes a dividing line from the dividing line information and generates a first dividing line, estimates a dividing line by extending the first dividing line and generates a second dividing line, estimates a dividing line on a basis of a positional relationship between a traveling trajectory of the other vehicle and the first dividing line and generates a third dividing line, and constructs an output dividing line to be output as a dividing line using at least one of the first dividing line, the second dividing line, or the third dividing line.

7 Claims, 16 Drawing Sheets

(51) Int. Cl.

| | |
|---|---|
| ***G01C 21/36*** | (2006.01) |
| ***G06T 7/13*** | (2017.01) |
| ***G06T 7/181*** | (2017.01) |
| ***G06T 7/70*** | (2017.01) |
| ***G08G 1/16*** | (2006.01) |

(58) Field of Classification Search

CPC . G06T 2207/10016; G06T 7/181; G06T 7/13; G01C 21/3602; G01C 21/3658; G08G 1/167

See application file for complete search history.

(56) References Cited

U.S. PATENT DOCUMENTS

| | | | | |
|---|---|---|---|---|
| 2010/0250064 | A1* | 9/2010 | Ota | B60W 40/076 348/148 |
| 2019/0251845 | A1* | 8/2019 | Kosaka | G08G 1/166 |
| 2020/0116499 | A1* | 4/2020 | Jung | G06V 20/588 |
| 2020/0117921 | A1* | 4/2020 | Okada | G06V 20/588 |
| 2021/0316751 | A1* | 10/2021 | Huberman | G05D 1/81 |
| 2022/0001872 | A1* | 1/2022 | Taieb | G06V 10/44 |

FOREIGN PATENT DOCUMENTS

| | | | | |
|---|---|---|---|---|
| JP | 2019-051808 A | | 4/2019 | |
| JP | 2020-087191 A | | 6/2020 | |
| WO | WO-2019222358 A1 | * | 11/2019 | G01C 21/3658 |

* cited by examiner

FIG. 8B

| RECOGNIZED DIVIDING LINE | EXTENDED DIVIDING LINE | TRAJECTORY DIVIDING LINE | RELIABILITY | ADOPTED DIVIDING LINE |
|---|---|---|---|---|
| ○ | — | — | HIGH | RECOGNIZED DIVIDING LINE |
| × | ○ | ○ | MEDIUM | TRAJECTORY DIVIDING LINE |
| × | × | × | — | NO |

DIVIDING LINE RECOGNITION DEVICE

TECHNICAL FIELD

The present invention relates to a dividing line recognition device.

BACKGROUND ART

In order to safely implement driving assistance or automatic driving in a vehicle traveling on a general road, a highway, or the like, it is necessary to detect a dividing line (lane boundary) with a dividing line detection sensor mounted on the vehicle, recognize a road boundary, and execute warning to a passenger or vehicle control on the basis of a recognition result. Examples of an alarm and the vehicle control include a lane deviation alarm, lane keeping control, automobile lane change, and lane change assistance. However, there is a case where due to fogging of a dividing line of a road, weather factors, and the like, detection of the dividing line by a sensor may fail, and a road boundary may not be correctly recognized. PTL 1 below discloses a technique for coping with a case where detection of a dividing line fails.

The lane boundary setting device described in PTL 1 acquires a detection result of a camera mounted on an own vehicle, recognizes at least one of a shape of a roadside object around a traveling direction or a movement history of another vehicle as peripheral information, estimates a reference line including a point sequence representing a road shape with points in a traveling direction of the own vehicle, and sets a position separated from the reference line by a predetermined distance to both sides in a vehicle width direction of the own vehicle as a lane boundary which is a boundary of a traveling lane of the own vehicle, so that the lane boundary which is a boundary of the traveling lane of the own vehicle can be set even in a case where the dividing line is not recognized. Further, PTL 1 discloses as a method for estimating the reference line, an example in which a coordinate position of the point sequence is estimated by shifting the recognized shape of the roadside object and the movement history of the other vehicle to the center in the vehicle width direction of the own vehicle.

CITATION LIST

Patent Literature

PTL 1: JP 2020-87191 A

SUMMARY OF INVENTION

Technical Problem

However, in the lane boundary setting device described in PTL 1, in a situation where arrangement of the roadside objects does not match the lane shape or in a situation where the preceding vehicle changes the lane, a lane boundary that does not conform to the actual lane shape is set, and there is a possibility that traveling in the lane cannot be maintained and the vehicle may deviate to the adjacent lane.

An object of the present invention is to provide a dividing line recognition device capable of generating dividing line information including a dividing line of a portion that cannot be detected by a sensor in a form in which reliability is added to each portion of the dividing line.

Solution to Problem

A dividing line recognition device of the present invention that solves the above problem includes: a dividing line information acquisition unit configured to acquire dividing line information around an own vehicle detected by a dividing line detection sensor mounted on the own vehicle; a target information acquisition unit configured to acquire target information around the own vehicle detected by a target detection sensor mounted on the own vehicle; an other vehicle state estimation unit configured to estimate a state of another vehicle on the basis of the target information; a first dividing line generation unit configured to recognize a dividing line from the dividing line information acquired by the dividing line information acquisition unit and generate the recognized dividing line as a first dividing line; and a second dividing line generation unit configured to estimate a dividing line by extending the first dividing line and generate the estimated dividing line as a second dividing line, a third dividing line generation unit configured to estimate a dividing line on the basis of a positional relationship between a traveling trajectory of the other vehicle estimated by the other vehicle state estimation unit and the first dividing line and generate the estimated dividing line as a third dividing line; and an output dividing line construction unit configured to construct an output dividing line to be output as a dividing line using at least one of the first dividing line, the second dividing line, or the third dividing line.

Advantageous Effects of Invention

According to the aspect of the present invention, the dividing line recognition device can output the dividing line information including the dividing line of the portion that cannot be detected by the sensor in a form in which reliability is added to each portion of the dividing line. Thus, in a case where the sensor cannot detect the dividing line, a lane boundary can be set in consideration of the reliability, and warning to a passenger and vehicle control can be implemented. In other words, it is possible to expand a range in which driving assistance or automatic driving functions.

Further features related to the present invention will become apparent from the description of the present specification and the accompanying drawings. Problems, configurations, and effects other than those described above will be clarified by the following description of embodiments, and the like.

BRIEF DESCRIPTION OF DRAWINGS

FIG. 8B is a view illustrating main processing of the output dividing line construction unit of the device illustrated in FIG. 1.

DESCRIPTION OF EMBODIMENTS

Hereinafter, embodiments of a dividing line recognition device according to the present disclosure will be described with reference to the drawings.

First Embodiment

Figure 1:
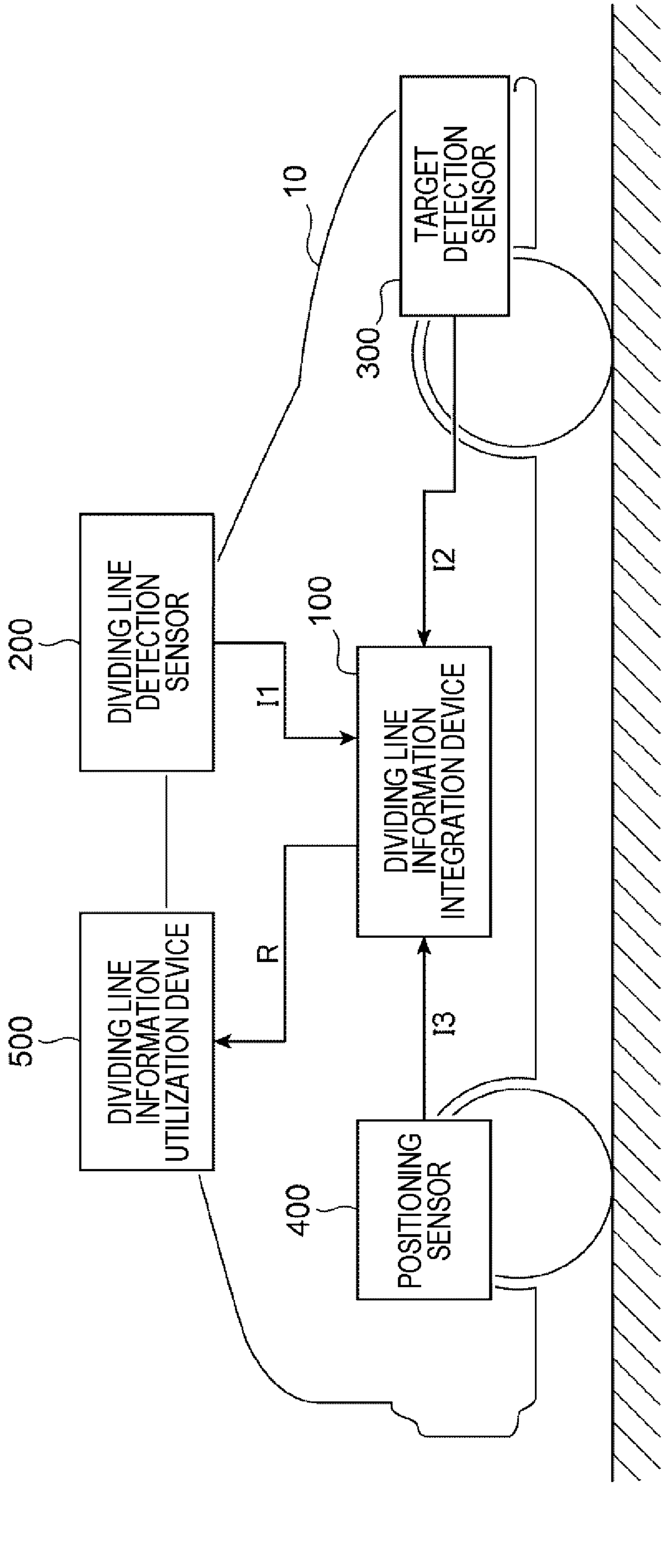
FIG. 1 is a hardware configuration diagram illustrating an embodiment of a dividing line recognition device according to the present invention.

FIG. 1 is a hardware configuration diagram illustrating an embodiment of a dividing line recognition device according to the present invention. A dividing line information integration device 100 of the present embodiment to which the dividing line recognition device according to the present invention is applied is mounted on a vehicle 10 and constitutes part of an advanced driver assistance system (ADAS) or an automated driving system (AD).

The dividing line information integration device 100 includes, for example, a central processing unit, a storage device such as a memory and a hard disk, a computer program stored in the storage device, and an input/output device. Specifically, the dividing line information integration device 100 is a computer system such as firmware or a microcontroller. Further, the dividing line information integration device 100 may be part of an electronic control unit (ECU) for an ADAS or an AD mounted on the vehicle 10.

The dividing line information integration device 100 is connected to a dividing line detection sensor 200, a target detection sensor 300, and a positioning sensor 400 mounted on the vehicle 10 so as to be able to perform information communication via a controller area network (CAN), in-vehicle Ethernet, or the like. The dividing line information integration device 100 receives detection results I1, I2, and I3 from the dividing line detection sensor 200, the target detection sensor 300, and the positioning sensor 400, respectively, and outputs output results R of these pieces of sensor information to a dividing line information utilization device 500.

Details of functions of the dividing line information integration device 100 will be described later.

The dividing line information integration device 100 is constituted so as to repeatedly perform operation with a predetermined period. The period of the operation of the dividing line information integration device 100 is not particularly limited, but may be a short period such as a period of 50 [ms] to improve immediate responsiveness or may be set to a long period such as a period of 200 [ms] to reduce power consumption by limiting the operation only to an alarm not related to control. In addition, the period may be dynamically switched to change balance between immediate responsiveness and power consumption as required by the situation. In addition, instead of the periodic processing, the processing may be started based on another trigger such as an input from a sensor to prevent unnecessary power consumption.

The dividing line detection sensor 200 is a sensor that is mounted on the vehicle 10 and detects dividing lines around the vehicle 10. The dividing line detection sensor 200 is, for example, a stereo camera, an entire circumference overhead camera system, a light detection and ranging (LIDAR), a monocular camera, or a sensor capable of detecting other dividing lines. Here, the dividing line is a road mark that divides lanes on the road and includes a lane boundary line displayed by a white or yellow solid line or broken line. Specifically, road marking paint, road studs, poles, stones, and the like, are generally used.

Recognition of the dividing line by the dividing line detection sensor 200 will be described using a stereo camera as an example. The stereo camera which is the dividing line detection sensor 200 detects a dividing line from image information. In addition, the stereo camera generates a parallax image from images of two cameras and measures a relative position from the vehicle 10, relative speed, a line type of the dividing line, and the like, with respect to each pixel of an image of the dividing line. Note that the output does not necessarily include all the information, and here, information on the relative position from the vehicle 10 to the dividing line is output to the dividing line information integration device 100 as the detection result I1.

The target detection sensor 300 is a sensor that is mounted on the vehicle 10 and detects a target around the vehicle 10. The target detection sensor 300 is a sensor capable of detecting a target, such as a radar, a LIDAR, or a sonar sensor. Here, the target indicates another vehicle traveling around the own vehicle, a guardrail and a curbstone provided along a road, or the like. The target detection sensor 300 outputs a relative position and relative speed of another vehicle 11 traveling around the own vehicle to the dividing line information integration device 100 as the detection result I2.

In addition, as sensors to be used for the dividing line detection sensor 200 and the target detection sensor 300, only one LIDAR may be used as a sensor capable of detecting both a dividing line and a target, and it is not always necessary to use a plurality of sensors.

The positioning sensor 400 includes, for example, a velocity sensor, an acceleration sensor, an angular velocity sensor, a steering angle sensor, a gyro sensor, and a satellite positioning system such as a global navigation satellite system (GNSS) mounted on the vehicle 10. Alternatively, instead of the target detection sensor 300 mounted on the own vehicle, an inter-vehicle communication function that transmits and receives a position and speed to and from the other vehicle 11 may be mounted to widely acquire the surrounding situation. The positioning sensor 400 outputs to dividing line information integration device 100, the detection result (positioning information) I3 including, for example, speed, acceleration, angular velocity, a steering angle, an attitude in a global coordinate system outside the own vehicle, and the like, of the vehicle 10. Note that the detection result I3 to be output by the positioning sensor 400 does not necessarily include all the above-described information, but includes, for example, at least the speed, acceleration, and angular velocity of the vehicle 10.

In addition, when a position and orientation of the vehicle 10 are obtained using the GNSS, in a case where satellite information cannot be acquired in a tunnel, a high-rise building, or the like, the position and orientation of the vehicle 10 may be complemented by odometry using a velocity sensor, an angular velocity sensor, a gyro sensor, or the like. In addition, the position and orientation of the vehicle 10 may be accurately obtained with a short period, and a difference between the position and orientation in the previous period and the current period may be calculated.

The dividing line information utilization device 500 includes an alarming device 510 or a vehicle control device 520 and issues a lane deviation alarm, performs lane keeping control, automobile lane change, and lane change assistance in accordance with the output result R of the dividing line information integration device 100.

Figure 2A:
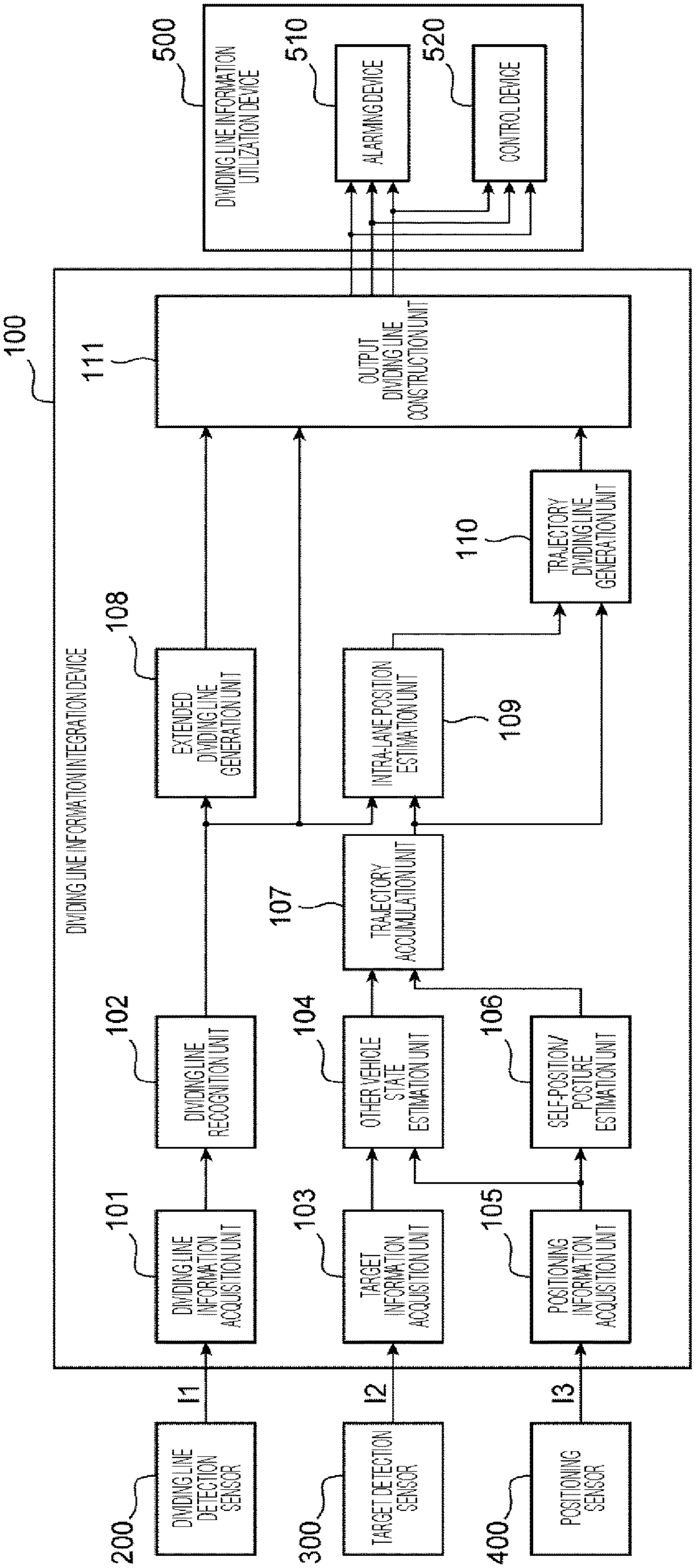
FIG. 2A is a functional block diagram of the dividing line recognition device illustrated in FIG. 1.

Hereinafter, functions of the dividing line information integration device 100 according to the present embodiment will be described in detail with reference to the drawings. FIG. 2A is a functional block diagram of the dividing line information integration device 100 illustrated in FIG. 1.

First, the outputs I1, I2, and I3 of the dividing line detection sensor 200, the target detection sensor 300, and the positioning sensor 400 are respectively passed to a dividing line information acquisition unit 101, a target information acquisition unit 103, and a positioning information acquisition unit 105 in the dividing line information integration device 100.

The dividing line information acquisition unit 101 acquires dividing line information around the own vehicle detected by the dividing line detection sensor 200. The dividing line information acquisition unit 101 performs time synchronization of the dividing line information detected by the dividing line detection sensor 200 and converts an output format into a format that can be easily handled by the dividing line information integration device 100 and outputs the converted information to a dividing line recognition unit 102 in the subsequent stage. The detection result I1 of the dividing line detection sensor 200 may be, for example, a parameter of an approximate curve based on a shape of the dividing line, such as a coefficient of a quadratic curve based on the shape of the dividing line. In this case, information capacity of the detection result I1 can be reduced as compared with a case where the detection result I1 is a recognition point sequence.

The target information acquisition unit 103 acquires target information around the own vehicle detected by the target detection sensor 300. The target information acquisition unit 103 performs time synchronization of the target information detected by the target detection sensor 300 and converts an output format into a format that can be easily handled by the dividing line information integration device 100 and outputs the converted information to an other vehicle state estimation unit 104 in the subsequent stage.

Similarly to the dividing line information acquisition unit 101 and the target information acquisition unit 103, the positioning information acquisition unit 105 performs time synchronization of the input information and converts a format of the information to be handled and outputs the converted information to a self-position/posture estimation unit 106 and the other vehicle state estimation unit 104 in the subsequent stage.

The dividing line information for integrating the dividing lines is generated from the information of the dividing line position, the other vehicle position, and the own vehicle position recognized so far.

First, here, roughly three types of dividing lines are generated. The first dividing line is a recognized dividing line which is a dividing line actually recognized by the vehicle 10, the second dividing line is an extended dividing line obtained by extending the recognized dividing line forward of the own vehicle, and the third dividing line is a trajectory dividing line generated from a traveling trajectory of the vehicle around the own vehicle.

The recognized dividing line, the extended dividing line, and the trajectory dividing line are identification information assigned to one dividing line, and an output dividing line construction unit 111 divides the dividing line into every small section, and assigns different information to each section. In particular, a dividing line with high reliability is adopted for a portion where information overlaps.

Figure 2B:
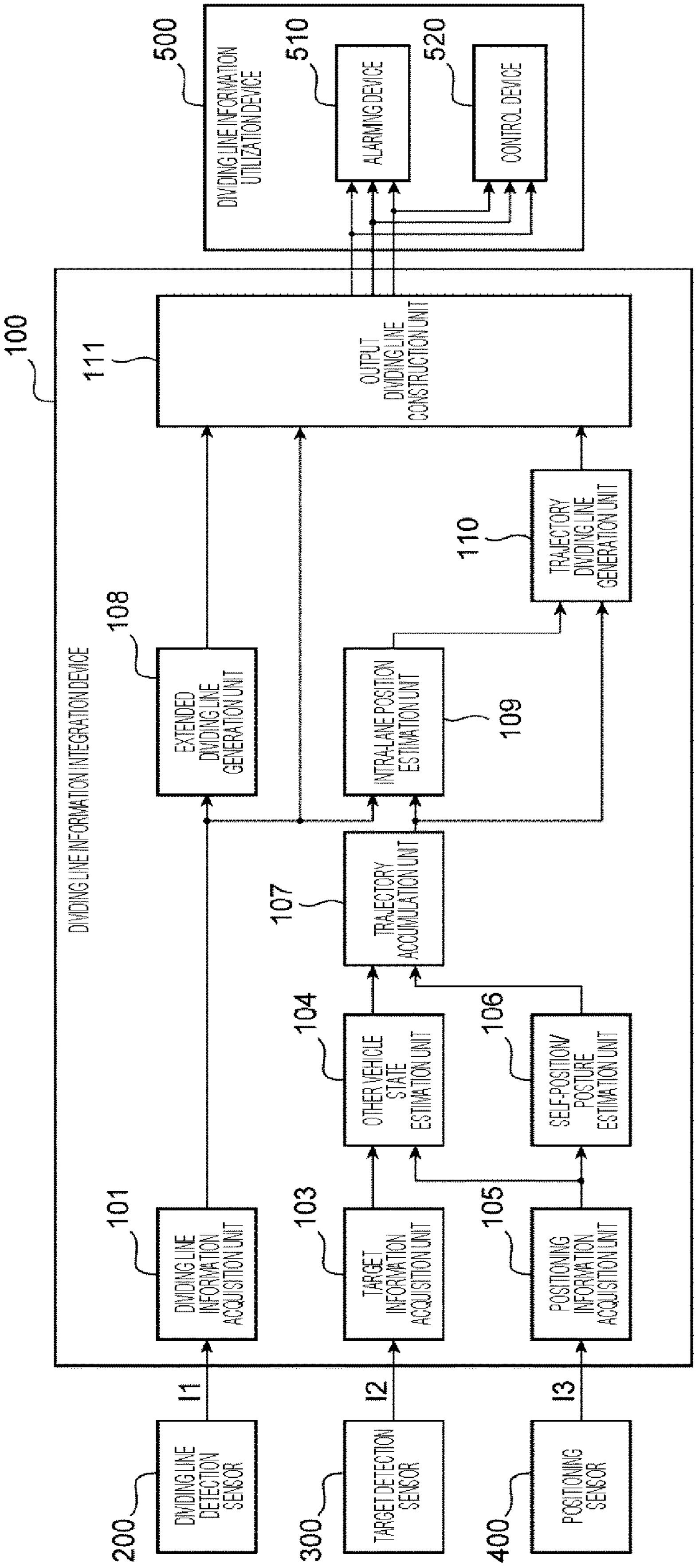
FIG. 2B is a derivative pattern of the functional block diagram of the dividing line recognition device illustrated in FIG. 1.

The dividing line recognition unit 102 sequentially processes the dividing line detection result output from the dividing line information acquisition unit 101 to recognize the dividing line. Actually, a plurality of dividing line detection sensors may be mounted on the vehicle 10, and in this case, a plurality of dividing line detection results may be passed to the dividing line recognition unit 102 for one dividing line. In this case, the plurality of dividing lines are integrated into one dividing line by the dividing line recognition unit 102. As illustrated in FIG. 2B, the dividing line information acquisition unit 101 and the dividing line recognition unit 102 in the preceding stage may be handled as one unit to simplify the functional block.

The other vehicle state estimation unit 104 sequentially processes the target detection results around the own vehicle output from the target information acquisition unit 103. The target refers to an object around the own vehicle, and examples thereof include vehicles such as cars and motorcycles, pedestrians, and guardrails and curbstones which are roadside objects on roads, but it is assumed here that other vehicles existing around the own vehicle are handled. The other vehicle state estimation unit 104 estimates at least a position and speed of another vehicle as a state of the other vehicle and outputs the estimated state to the processing unit in the subsequent stage. In addition, in a case where the target detection sensor 300 cannot detect another vehicle, the other vehicle position and speed information output from the positioning sensor 400 may be used.

The self-position/posture estimation unit 106 receives velocity, acceleration, and the angular velocity of the own vehicle output from the positioning information acquisition unit 105 and calculates posture (hereinafter, position/posture) such as a position and orientation of the own vehicle in a global coordinate system outside the own vehicle using a Kalman filter, or the like. Then, the self-position/posture estimation unit 106 outputs the posture to a history accumulation unit 112 and a trajectory accumulation unit 107 in the subsequent stage.

The trajectory accumulation unit 107 receives a relative position of the other vehicle with respect to the own vehicle, which is the output of the other vehicle state estimation unit 104, and the position/posture of the own vehicle, which is the output of the self-position/posture estimation unit 106, and generates a traveling trajectory of the other vehicle in the global coordinate system outside the own vehicle.

An extended dividing line generation unit 108 (second dividing line generation unit), an intra-lane position estimation unit 109, a trajectory dividing line generation unit (third dividing line generation unit) 110, and an output dividing line construction unit 111, which are main components in the present invention, will be described below with reference to FIGS. 3 to 8B.

Figure 3:
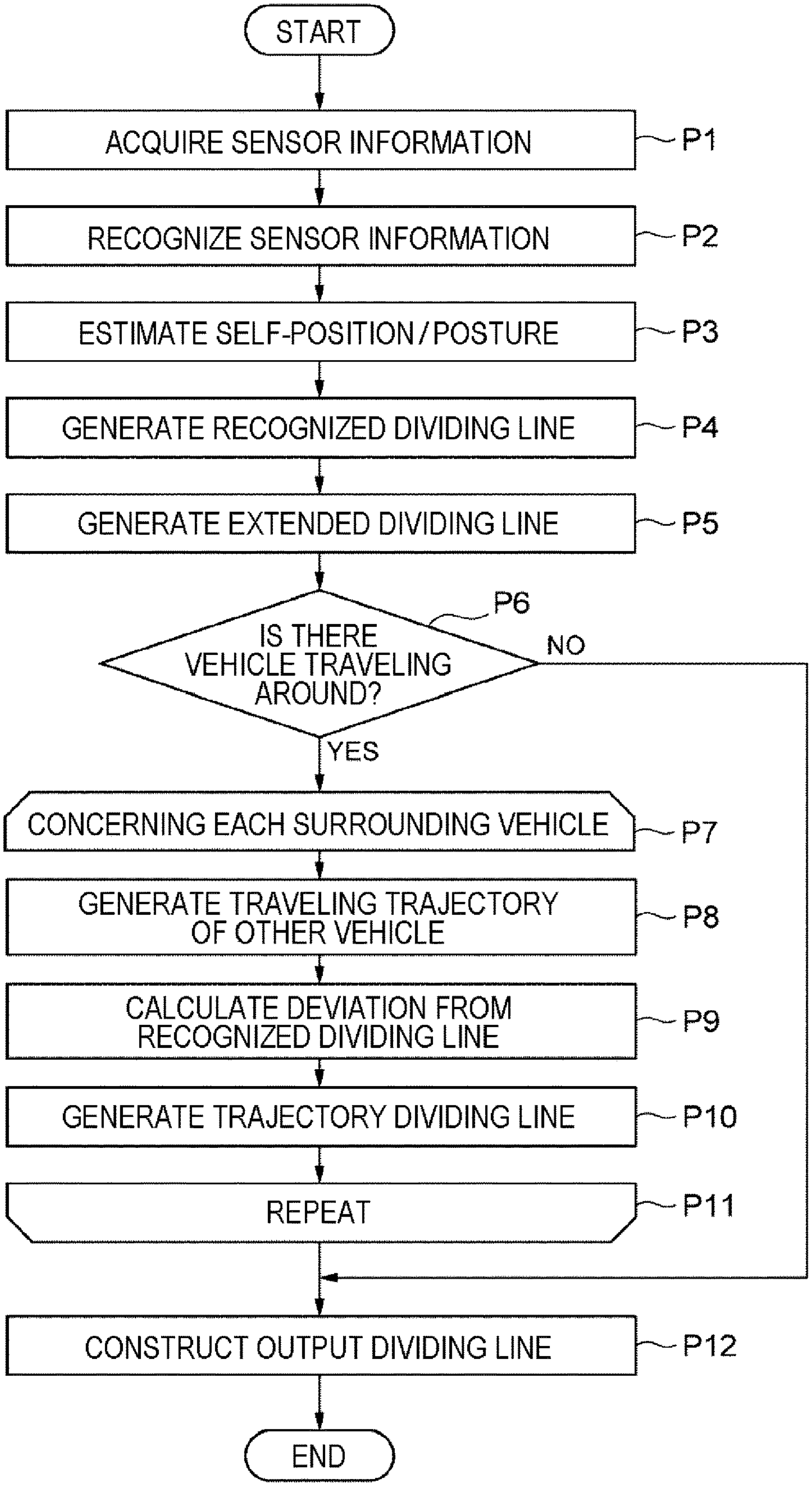
FIG. 3 is an overall processing flowchart of the dividing line recognition device illustrated in FIG. 1.

First, an overall processing flow is illustrated in FIG. 3. In processing P1, sensor information of the dividing line detection sensor 200, the target detection sensor 300, and the like, is acquired, and in processing P2, time synchronization, format conversion, and the like, are performed on the sensor information in sensor information recognition processing in the dividing line information acquisition unit 101, the target information acquisition unit 103, and the like, and the sensor information is converted into information that is easy to handle by the dividing line information integration device 100. In this event, in a case where a plurality of sensors capable of detecting the same dividing line or the same target is mounted on the vehicle 10, fusion processing for integrating the same pieces of information into one may also be performed. In processing P3, self-position/posture information (the position/posture of the own vehicle) necessary for accumulating the recognized dividing lines of the vehicle 10 and accumulating the traveling trajectory of the other vehicle 11 is estimated. In the processing P3, the self-position/posture information is estimated on the basis of the sensor information recognized in the processing P2. In processing P4, the dividing line is recognized from the information of the dividing line recognized in the processing P2, and the recognized dividing line is generated as the recognized dividing line. The recognized dividing line is generated by converting the dividing line recognized in the processing P2 into a likely shape using a least squares method, or the like. The processing in the processing P4 corresponds to a recognized dividing line generation unit (first dividing line generation unit) that generates the recognized dividing line. Further, in processing P5, the recognized dividing line recognized in the previous stage is extended and expanded to a non-detection range of the sensor, thereby generating the extended dividing line. Here, the recognized dividing line is extended to estimate a dividing line, and the estimated dividing line is generated as the extended dividing line. The extended dividing line is formed by extending the recognized dividing line on the basis of the shape of the recognized dividing line. The processing in the processing P5 corresponds to an extended dividing line generation unit (second dividing line generation unit) that generates the extended dividing line. In processing P6, it is checked whether there is a vehicle in the own lane, the adjacent lane, or the like, and if there is a vehicle, the processing from the processing P7 to P11 is repeated for each vehicle. If not, the output dividing line construction processing in processing P12 is performed on the recognized dividing line recognized in the processing P4 or the extended dividing line generated in the processing P5, and the processing ends.

Further, processing P7 and subsequent processing will be described. In processing P8, the other vehicle traveling trajectory is generated from the position of the other vehicle outside the own vehicle in the global coordinate system acquired in advance. In processing P9, the dividing line is estimated on the basis of the positional relationship between the traveling trajectory of the other vehicle and the recognized dividing line generated in the processing P8, and the estimated dividing line is generated as the trajectory dividing line. In the processing P9, a distance between the other vehicle traveling trajectory and the recognized dividing line, which is required by the trajectory dividing line generation unit 110, is calculated. The distance between the other vehicle traveling trajectory and the recognized dividing line is a distance in the road width direction between the other vehicle traveling trajectory and the recognized dividing line. In processing P10, a trajectory dividing line is generated from the distance information obtained in the processing P9. The processing from the processing P9 and P10 corresponds to a trajectory dividing line generation unit (third dividing line generation unit) that generates the trajectory dividing line. If the trajectory dividing lines have been generated for all the vehicles around the own vehicle at the time of processing P11, the processing proceeds to the last processing P12.

In the processing P12, an output dividing line to be output as a dividing line is constructed using at least one of the recognized dividing line, the extended dividing line or the trajectory dividing line. Specifically, the recognized dividing line, the extended dividing line, and the trajectory dividing line that have been generated so far are combined and evaluated in descending order of reliability, and the three types of dividing lines described on the left are adopted for each small section of one dividing line and used as an output of the dividing line information integration device 100. In the present embodiment, not only one type of dividing line such as only the recognized dividing line or only the trajectory dividing line is output, but different dividing lines are adopted for each small section even if the reliability is low, and are output from the dividing line information integration device 100. The different dividing lines are adopted to output as much dividing line information as possible regardless of a level of reliability for a certain dividing line to be recognized, and it is assumed that how to use these pieces of information is left to a control device in the subsequent stage (information as much as possible is passed to the control device in the subsequent stage in order to broaden options of controllability of the vehicle). However, only one of the recognized dividing line, the extended dividing line, and the trajectory dividing line having the highest reliability may be adopted and output as the output dividing line.

Hereinafter, details of the processing will be described with reference to the image diagrams of FIGS. 4 to 7.

Figure 4:
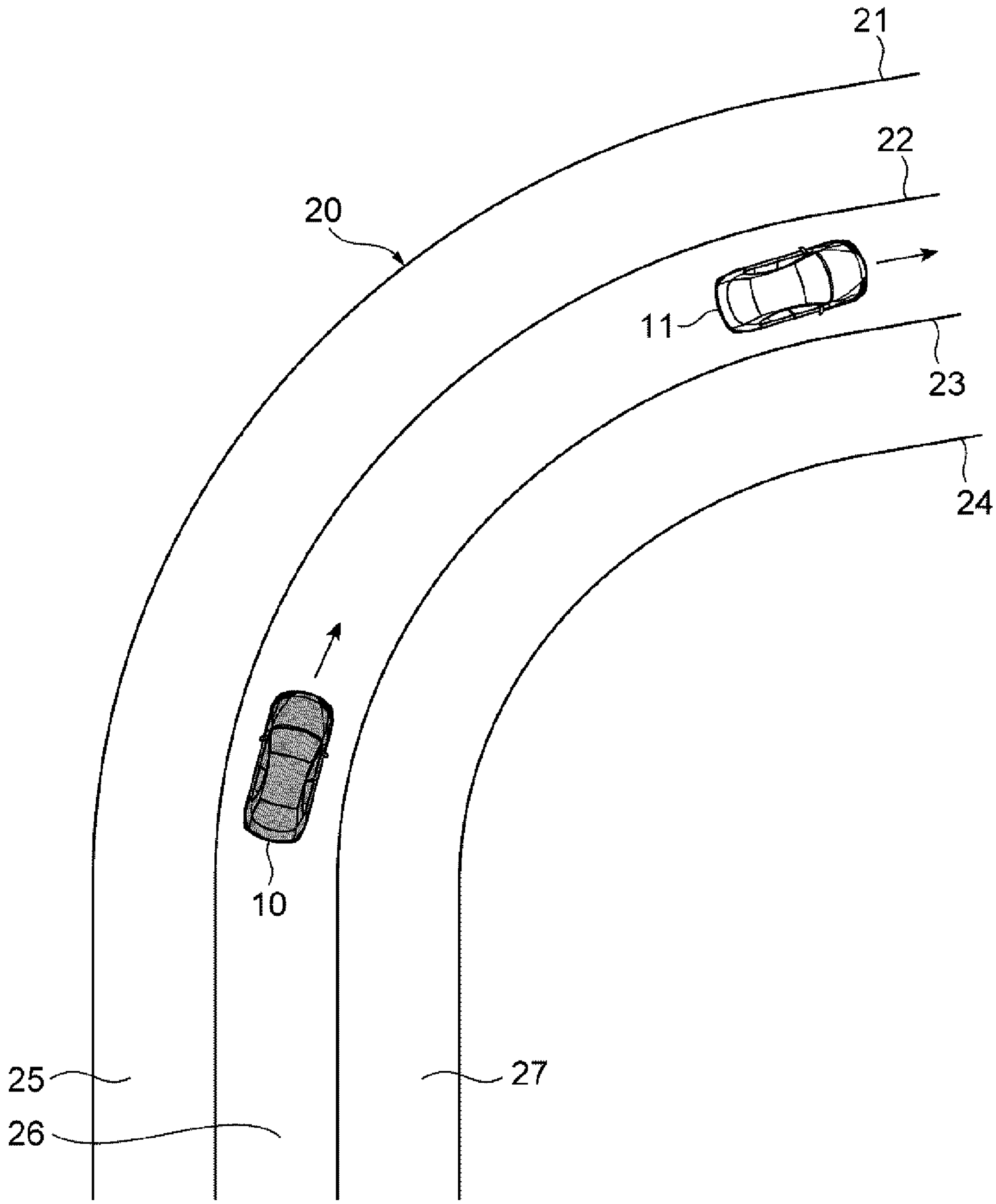
FIG. 4 is a plan view of a vehicle equipped with the device illustrated in FIG. 1 when the vehicle is traveling in a lane.

FIG. 4 illustrates a basic image for describing the present invention. Here, as an example, it is assumed that a dividing line 20 is drawn on a road that changes from a straight section to a curved section, and another vehicle 11 is traveling in front of the vehicle 10 equipped with the dividing line information integration device 100, the dividing line detection sensor 200, the target detection sensor 300, the positioning sensor 400, and the dividing line information utilization device 500. In FIG. 4, four dividing lines 21, 22, 23, and 24 are drawn as dividing lines 20, and three lanes 25, 26, and 27 are provided. Then, an example is illustrated in which the vehicle 10 and the other vehicle 11 are traveling in the center lane 26 among the three lanes 25, 26, and 27.

Figure 5:
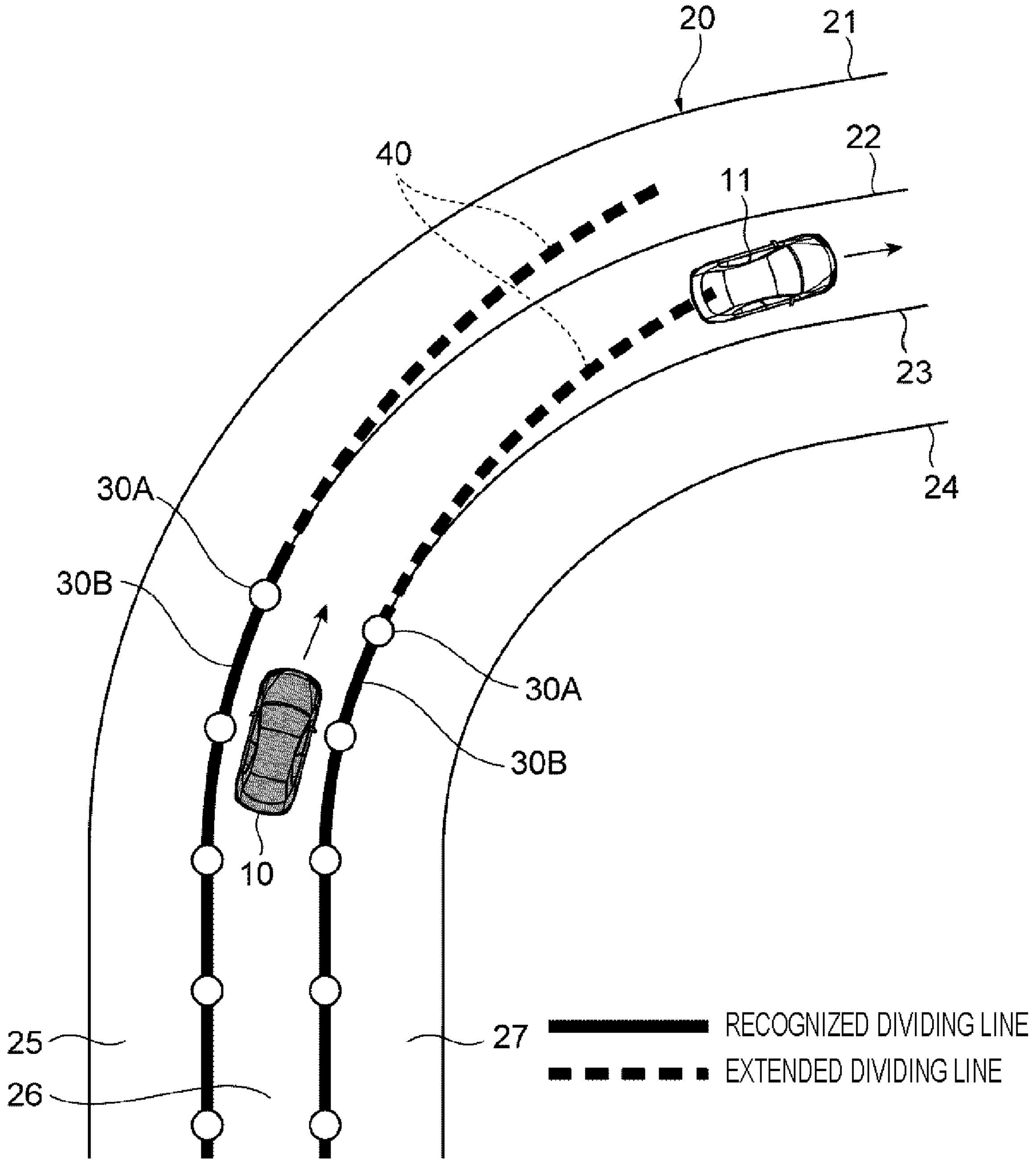
FIG. 5 is a view illustrating an example in which the vehicle equipped with the device illustrated in FIG. 1 generates an extended dividing line.

FIG. 5 is a conceptual diagram in which the dividing line detection sensor 200 detects the dividing line, the dividing line information acquisition unit 101 and the dividing line recognition unit 102 recognize the own vehicle relative position of the dividing line and passes the recognition result to the extended dividing line generation unit 108 to generate the extended dividing line 40.

The extended dividing line generation unit 108 has a function of generating an extended dividing line obtained by extending the dividing line forward of the own vehicle by using the recognized dividing line output from the dividing line recognition unit 102. Specifically, first, the received recognized dividing line is projected from the own vehicle coordinate system to the global coordinate system outside the own vehicle, and then converted into an approximate curve such as a straight line or a circle using a least squares method, or the like. This complements the dividing line in preparation for a case where the dividing line is not detected due to fogging of the dividing line itself or outside a detection range of the dividing line detection sensor 200, or a case where the dividing line cannot be detected due to back light such as sunlight. Then, the output dividing line is output to the output dividing line construction unit 111 in the subsequent stage. FIG. 5 illustrates this state. FIG. 5 illustrates a detected dividing line 30A and a dividing line 30B redrawn as the recognized dividing line based on this detection result. An extended dividing line 40 indicated by a broken line in the drawing is a dividing line obtained by simply extending the dividing line forward of the own vehicle based on the shape of the recognized dividing line 30B. As a method of extending the shape of the recognized dividing line 30B forward of the own vehicle, for example, a known method such as geometric calculation is used. Thus, in a section in which the road shape changes, such as a straight section to a curved section, although the shape of the dividing line in the vicinity of the own vehicle matches the shape of the dividing line of the actual road, it is not always possible to express a shape along the entire actual road including the distant dividing line.

Figure 6:
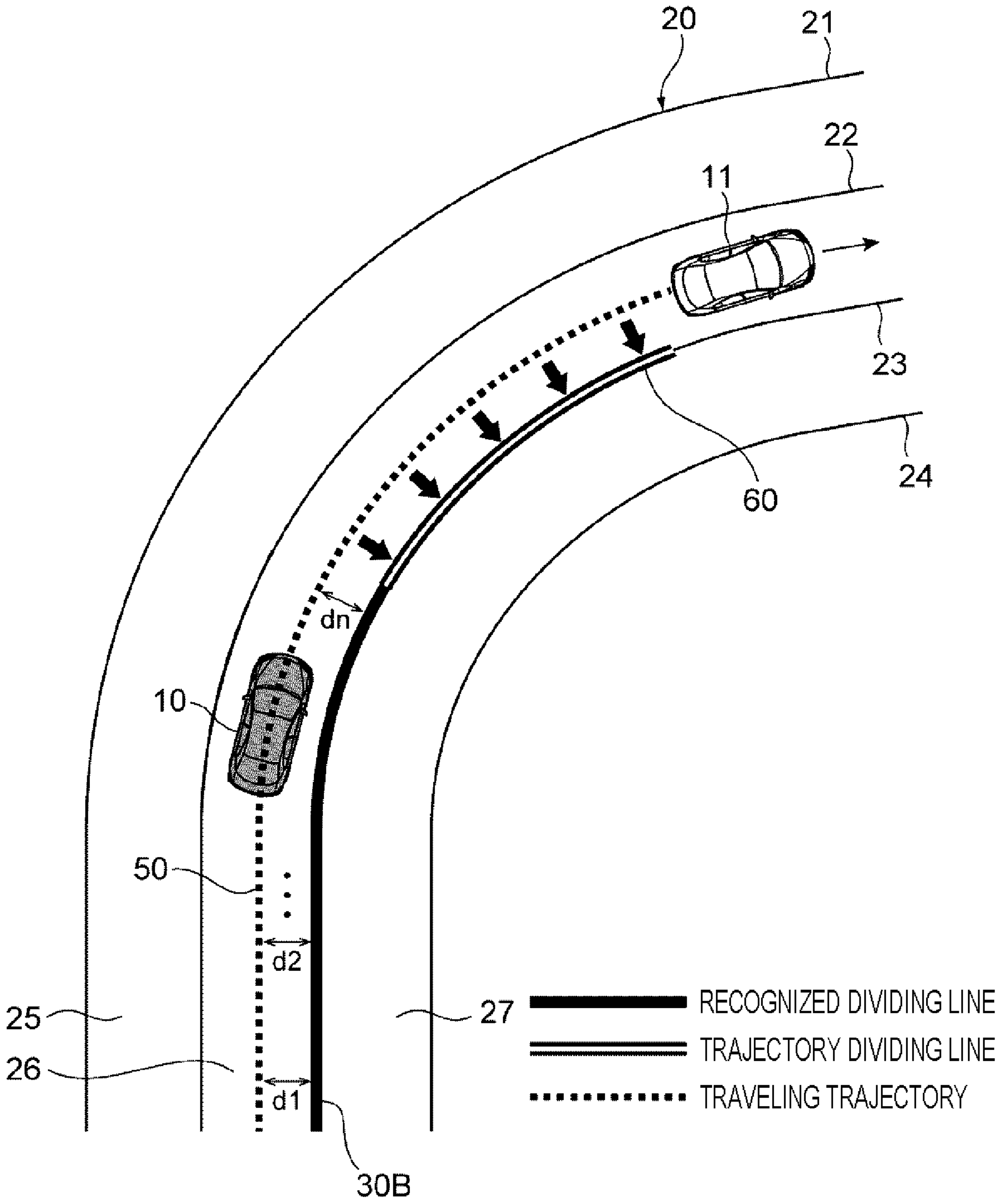
FIG. 6 is a view illustrating an example in which the vehicle equipped with the device illustrated in FIG. 1 generates a trajectory dividing line.

FIG. 6 is a conceptual diagram in which a relative position of the other vehicle and the position/posture of the own vehicle in the global coordinate system outside the own vehicle are calculated using the target detection sensor 300 and the positioning sensor 400, the traveling trajectory 50 of the other vehicle 11 traveling in front of the own vehicle is recognized, and the recognition result is passed to the trajectory accumulation unit 107 to generate the intra-lane position and the trajectory dividing line 60 of the other vehicle 11.

The intra-lane position estimation unit 109 performs processing of estimating the position of the other vehicle 11 in the lane using the information on the dividing line recognized by the dividing line recognition unit 102 and the information on the traveling trajectory of the other vehicle 11 accumulated by the trajectory accumulation unit 107.

The trajectory dividing line generation unit 110 generates the trajectory dividing line 60 on the basis of the positional relationship between the traveling trajectory 50 of the other vehicle 11 and the recognized dividing line 30B of the own vehicle. Specifically, the intra-lane position estimation unit 109 obtains a distance between the traveling trajectory 50 of the other vehicle 11 and the recognized dividing line 30B of the own vehicle for each certain section (d1 to dn), takes an average value, uses the average value as an offset value from the traveling trajectory 50 and shifts the traveling trajectory to obtain the trajectory dividing line 60. The trajectory dividing line 60 can be used as a substitute for the recognized dividing line 30B that cannot be detected by the own vehicle. However, the distance in the intra-lane position estimation is not limited to the average, and the distance of the section may be obtained using learning. In addition, for a section in which a lane width is not constant but changes, the offset value may be estimated by linearly increasing or decreasing the offset value in view of the change in distance. For the section of the trajectory dividing line 60, for example, a section from a place where the recognized dividing line does not exist to a rear end of the other vehicle 11 is considered. In the example illustrated in FIG. 6, the trajectory dividing line 60 inside the curve is obtained on the basis of the distance between the recognized dividing line 30B inside the curve and the traveling trajectory 50 of the other vehicle 11, but the trajectory dividing line outside the curve can also be obtained on the basis of the distance between the recognized dividing line 30B outside the curve (see FIG. 5) and the traveling trajectory 50 of the other vehicle 11.

Figure 7:
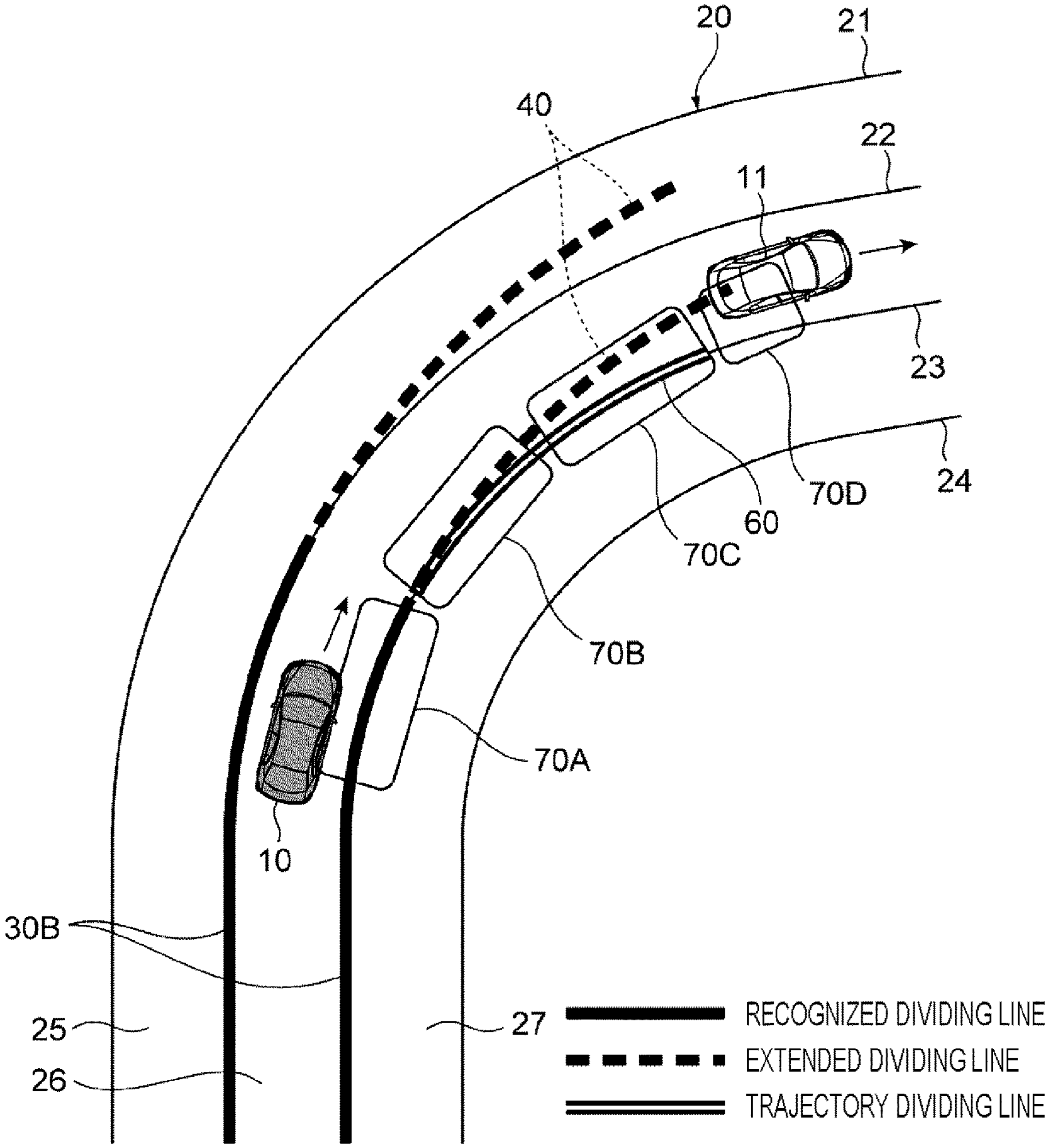
FIG. 7 is a view illustrating an example in which the vehicle equipped with the device illustrated in FIG. 1 sets a dividing line and reliability thereof.

FIG. 7 is a conceptual processing diagram of the output dividing line construction unit 111. In the present embodiment, different reliability is set for each small section for one dividing line. As an example, a state in which one dividing line is configured by a plurality of pieces of dividing line information for each of sections 70A, 70B, 70C, 70D is illustrated. A method for selecting the dividing line information to be output among the plurality of dividing line information will be described with reference to a processing flowchart 8A and a main processing diagram 8B of the output dividing line construction unit 111. In the state illustrated in FIG. 7, it is assumed that dividing lines 22 and 23 ahead of the recognized dividing line 30B cannot be recognized by the dividing line detection sensor 200 of the vehicle 10 due to, for example, backlight or fogging.

First, it is confirmed whether or not the dividing line information to be processed exists (P21), and in a case where the dividing line information exists (YES), the dividing line to which the dividing line information is assigned is divided into a plurality of sections (P22). Then, which dividing line information is to be output is determined with reference to the dividing line information in each section and through combination of the recognized dividing line, the extended dividing line and the trajectory dividing line (P23 to P25). In this event, it is assumed that reliability decreases in the order of the recognized dividing line, the trajectory dividing line, and the extended dividing line as the order of the reliability of the dividing line information. This is because, as the order of the reliability, in a case where the recognized dividing line exists, the dividing line can be actually detected, and thus, the reliability is assumed to be the highest as compared with the extended dividing line and the trajectory dividing line which are other estimated dividing lines. In the extended dividing line and the trajectory dividing line, the trajectory dividing line generated based on a traveling trajectory having a trajectory record that another vehicle 11 has actually traveled is assumed to have higher reliability than the extended dividing line obtained by simply extending the recognized dividing line.

Figure 8A:
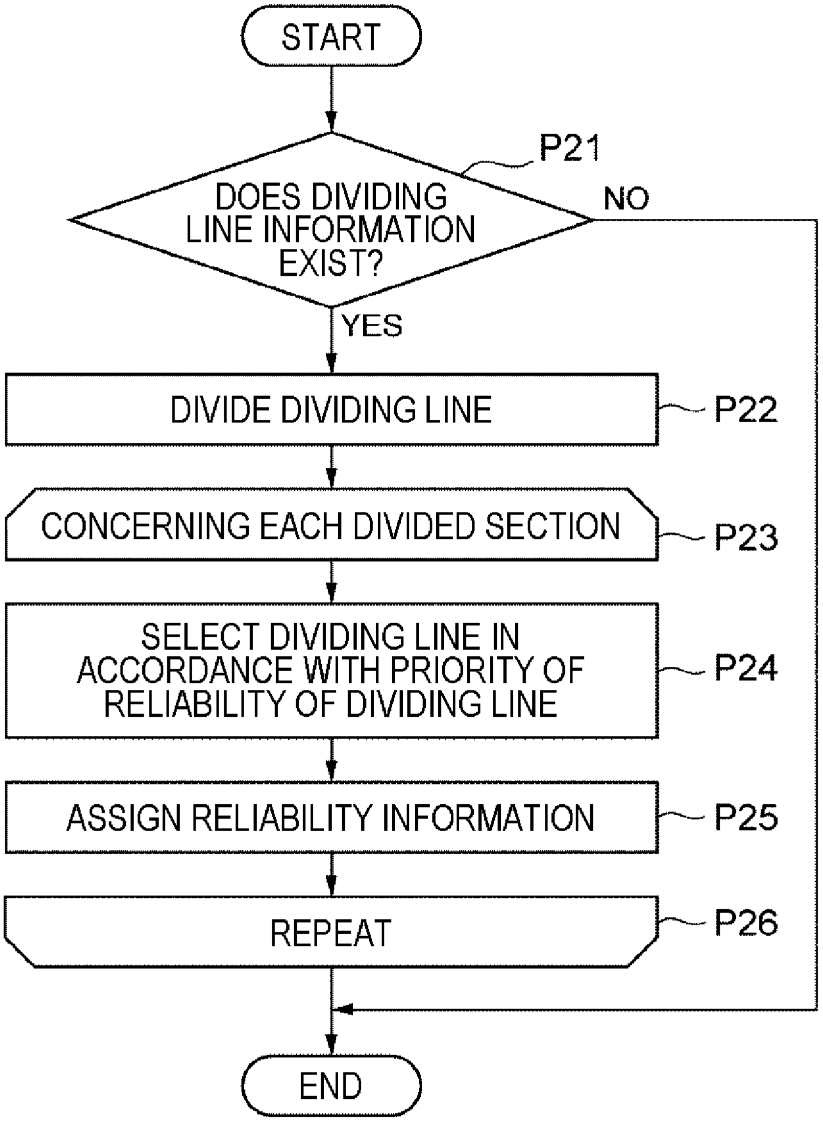
FIG. 8A is a view illustrating a processing flow of an output dividing line construction unit of the device illustrated in FIG. 1.

Next, the reliability for each section and a selection target of the employed dividing line are determined on the basis of a combination table of FIG. 8B. In a case where the recognized dividing line exists from the order of the reliability of the dividing line, only the recognized dividing line is adopted and high reliability information is assigned. In a case where both the extended dividing line and the trajectory dividing line exist and the distance between both is equal to or less than a threshold, the trajectory dividing line is adopted and medium reliability information is given. In this event, in a case where both the distances are larger than the threshold, both the dividing lines do not coincide with each other because the other vehicle 11 has traveled along the dividing line due to a lane change, or the like, or the shape of the dividing line of the road suddenly changes. Thus, low reliability information is assigned to both of the dividing line information, and then a more reliable dividing line is adopted. In a case where only the trajectory dividing line exists, the trajectory dividing line is adopted and low reliability information is given, and in a case where only the extended dividing line exists, the extended dividing line is similarly adopted and low reliability information is given. Here, three types of reliability information of high, medium, and low are set, but the reliability may be more strictly set to improve the reliability of the entire dividing line, and the present invention is not limited thereto.

Next, an example of a method of dividing the dividing line into small sections will be described with reference to FIG. 7.

Here, each of the dividing lines 30B, 40, and 60 is divided into small sections 70A to 70D at predetermined intervals. First, the same dividing lines are grouped for each dividing line (recognized dividing line, extended dividing line, trajectory dividing line) at a certain moment. For example, separation distances of the respective dividing lines in the lane width direction are compared in a brute-force manner, and dividing lines that are closest to each other and have the separation distance equal to or less than a threshold (for example, a distance of half the lane width) are grouped into one group. Here, the extended dividing line extends from the recognized dividing line, and thus, they can be regarded as the same group. The separation distance may be calculated as an average of distance errors of the dividing lines to be compared obtained for each certain range. In the example illustrated in FIG. 7, when the vehicle 10 is viewed from the center, three of the recognized dividing line 30B on the right side of the own vehicle, the extended dividing line 40 on the right side of the own vehicle, and the trajectory dividing line 60 form the same group, and the dividing line 30B on the left side of the own vehicle and the dividing line 40 on the left side of the own vehicle form another same group.

Next, among the dividing lines in the same group, the recognized dividing line and the extended dividing line are searched in a certain range from a start point of the dividing line in an extension direction, and it is determined whether there is a trajectory dividing line which is perpendicular to the extension direction of the recognized dividing line and the extended dividing line (dividing line width direction) and falls within the range. Then, in a case where the trajectory dividing line exists, a separation distance from the recognized dividing line and the extended dividing line is calculated, and the section 70B is set for a portion equal to or less than a threshold (for example, about twice the dividing line width). Then, the section 70C is set for a portion where the separation distance is larger than the threshold. Then, the section 70A is set for a portion where only the recognized dividing line 30B exists, and the section 70D is set for a portion where only the extended dividing line 40 exists. The threshold to be used in the section division varies depending on the sensor to be used and the traveling lane width, and thus, may be changed in accordance with sensor characteristics and an actual traveling environment.

As a method of dividing the dividing line into the small sections, a method of dividing the dividing line from the origin of the own vehicle coordinate system in the own vehicle traveling direction at a constant interval may be adopted, or each line may be divided at a constant interval so as to strictly follow the dividing line, and the dividing line included in the divided area may be selected. Alternatively, although a large amount of calculation and a large amount of memory are required, as a simple method, the dividing line may be divided into a lattice shape on the basis of the origin of the own vehicle coordinate system, and the dividing line information that falls within each cell may be combined. Here, the threshold of the distance is assumed based on the dividing line width and is set to be twice the dividing line width.

Based on these kinds of processing, the recognized dividing line 30B that is the high reliability information is set in the section 70A in FIG. 7, the trajectory dividing line 60 that is the medium reliability information is set in the section 70B, the trajectory dividing line 60 that is the low reliability information is set in the section 70C, and the extended dividing line 40 that is the low reliability information is set in the section 70D. Here, the trajectory dividing line 60 is employed as the dividing line in the section 70B. However, in this section, an integrated dividing line in which dividing lines are integrated may be employed, for example, an average value of coordinates of the trajectory dividing line 60 and the extended dividing line 40 may be taken.

Figure 9A:
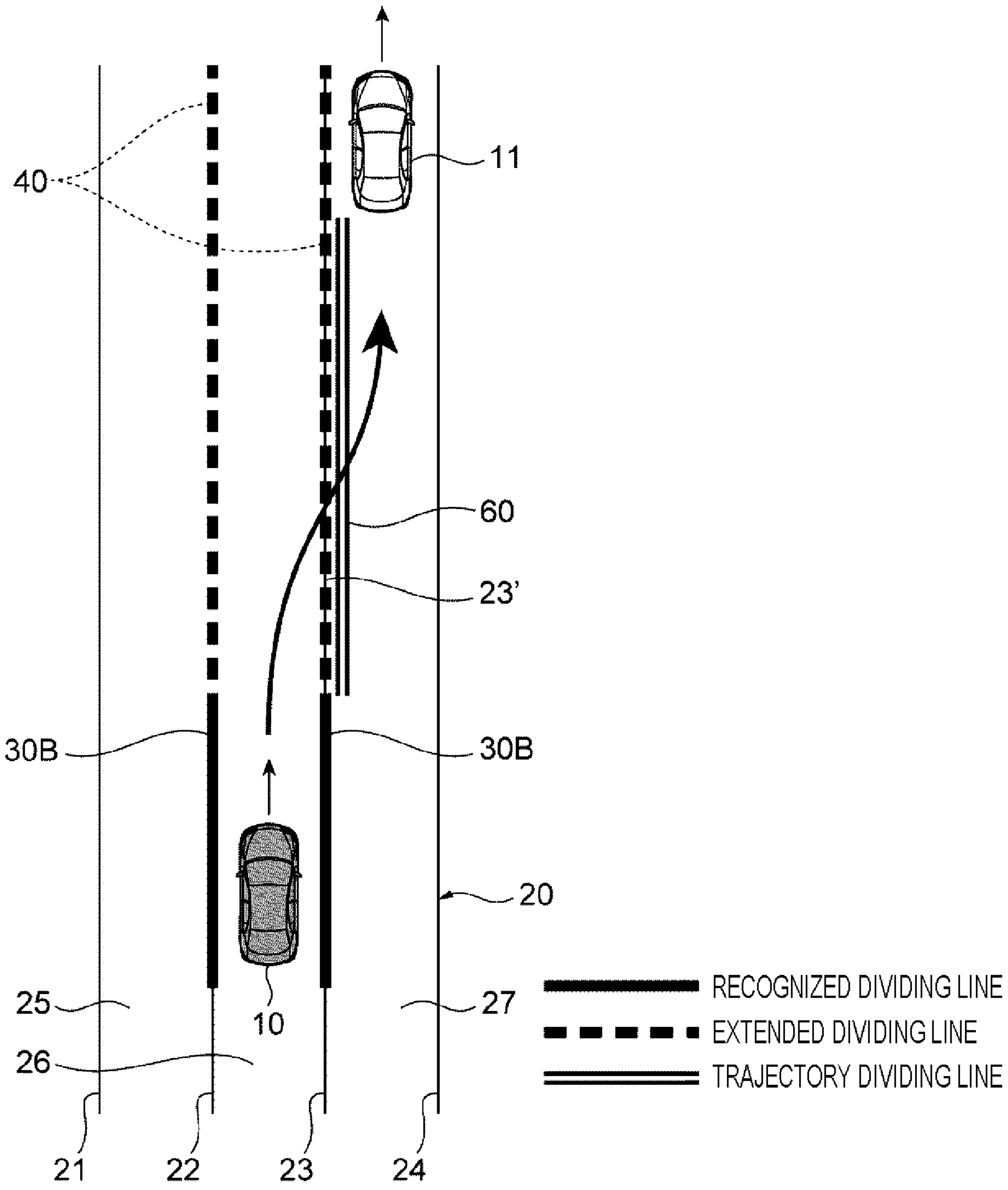
FIG. 9A is an image diagram of a utilization scene of a first embodiment.
Figure 9B:
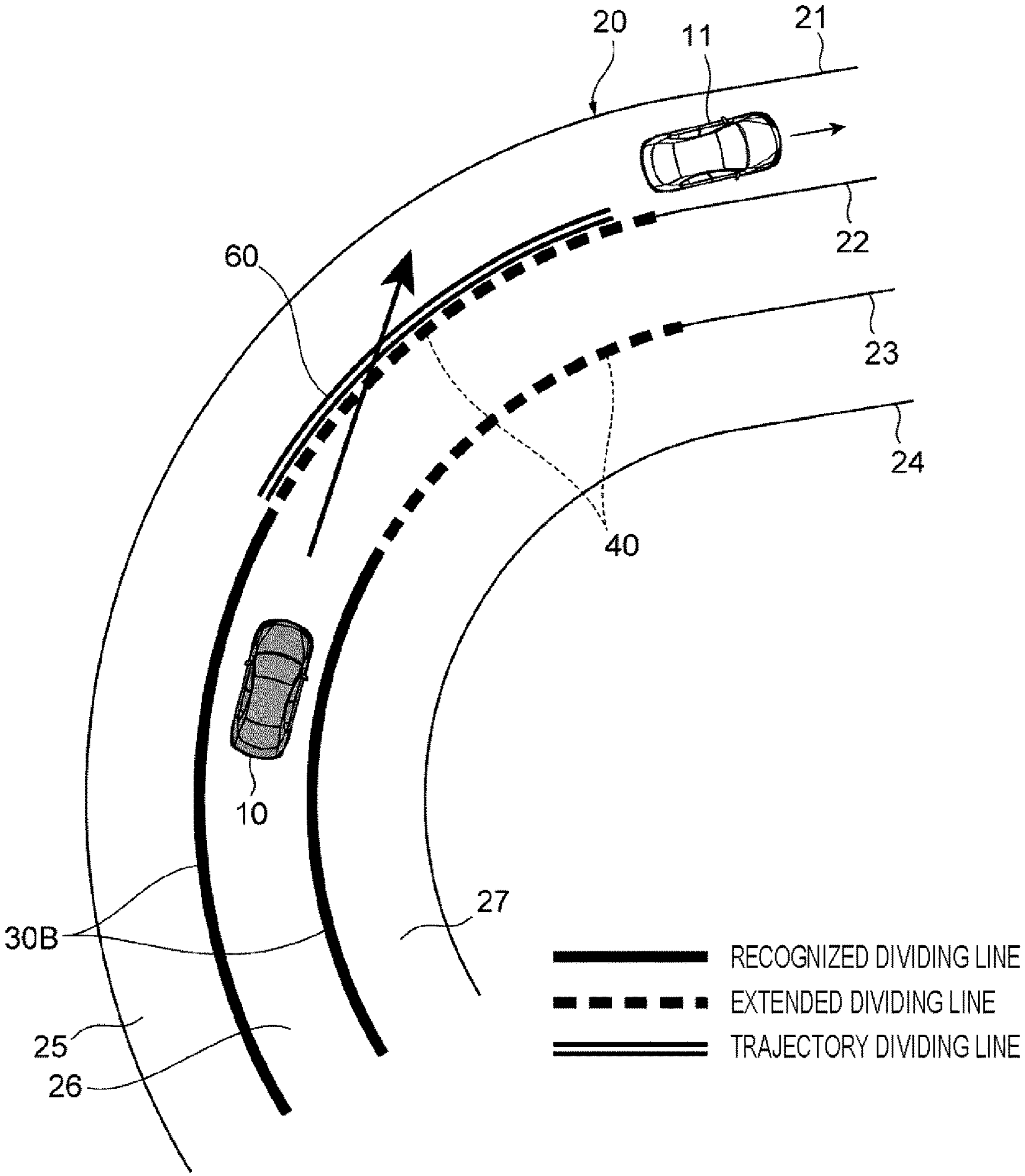
FIG. 9B is an image diagram of the utilization scene of the first embodiment.

FIGS. 9A and 9B illustrate examples of scenes where the effect of the present invention is remarkable. For example, in FIG. 9A, a situation is assumed in which the vehicle 10 travels in a traveling lane 26 toward a certain destination and it is necessary to change the lane to a right lane 27, and dividing lines 22 and 23 in front cannot be detected due to some factors. Then, as a result of the other vehicle 11 traveling ahead, a trajectory dividing line 60 can be generated, and a dividing line 23' on the right side of the vehicle 10 can be generated along with the extended dividing line 40. This allows the vehicle to change the lane to the right lane 27.

Further, in FIG. 9B, in a case of a scene where the vehicle 10 needs to keep a lane while traveling in a curved section, the left trajectory dividing line 60 can be generated by the other vehicle 11 traveling ahead in a situation where the dividing lines 22 and 23 in front cannot be similarly detected. Thus, the vehicle 10 can issue a lane deviation alarm to a driver of the vehicle 10 or continue the lane keeping control, so that a risk of lane deviation can be reduced.

Although basic utilization scenes and methods of the present invention have been described so far, FIG. 10 will be described as other utilization scenes.

Figure 10:
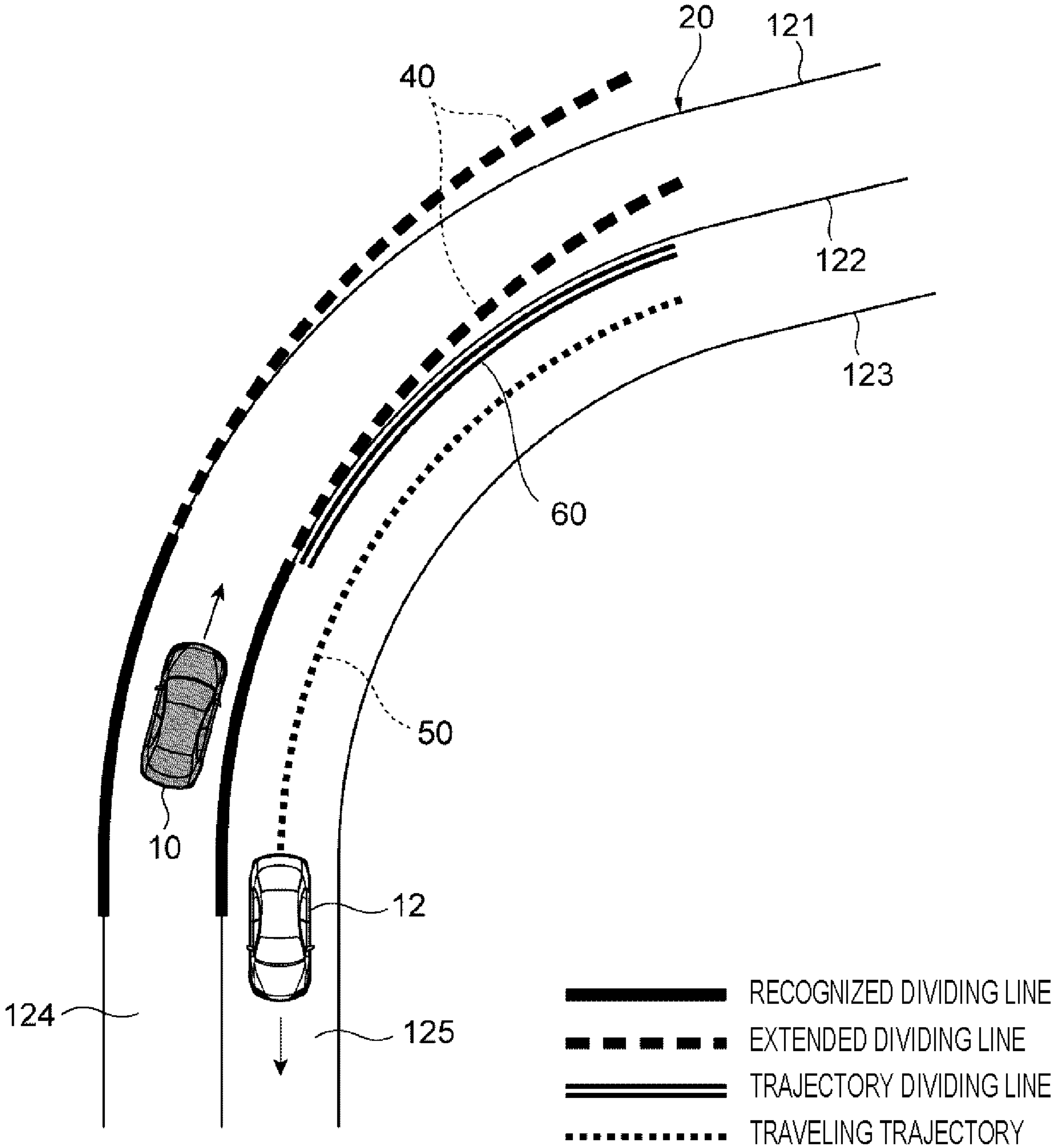
FIG. 10 is an image diagram of the first embodiment in a case where another vehicle is traveling in an opposite lane.

FIG. 10 is a scene in which another vehicle 10 is traveling from the front to the rear in the opposite lane next to the traveling lane in which the vehicle 12 is traveling. FIG. 10 illustrates an example in which three dividing lines 121, 122, and 123 are drawn as dividing lines 20, the vehicle 10, which is an own vehicle, travels in a traveling lane 124 between the dividing line 122, which is a center line, and the dividing line 121 on the left side thereof, and another vehicle 12, which is an oncoming vehicle, travels in an opposite lane 125 between the dividing line 122 and the dividing line 123 on the right side thereof. Similarly, the trajectory dividing line 60 having the medium reliability information can be generated with respect to the section in which the trajectory dividing line 60 obtained from the traveling trajectory 50 of the other vehicle 12 and the extended dividing line 40 obtained from the recognized dividing line of the vehicle 10 overlap with each other. Thus, even in a situation where the vehicle 10 cannot detect the dividing lines 121 and 122 in front, the lane keeping control can be executed to prevent the vehicle from jumping out of the traveling lane 124.

Second Embodiment

Figure 11:
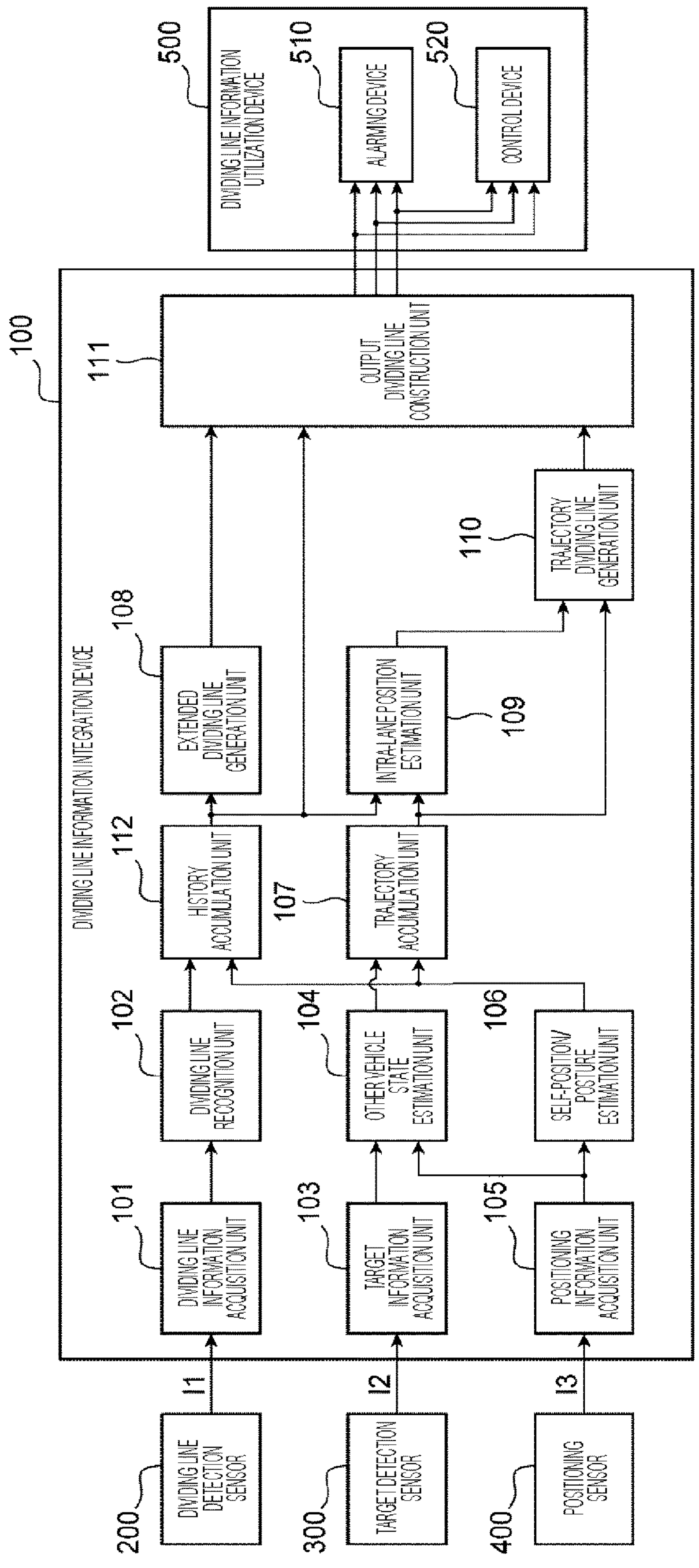
FIG. 11 is a derivative pattern of a functional block diagram of a dividing line recognition device according to a second embodiment.

In the dividing line information integration device 100 according to a second embodiment illustrated in FIG. 11, a history accumulation unit 112 is newly provided between the dividing line recognition unit 102 and the extended dividing line generation unit 108. The history accumulation unit 112 accumulates, as a history, information on the past recognized dividing lines detected by the dividing line recognition unit 102 of the vehicle 10 and the position/posture of the own vehicle of the self-position/posture estimation unit 106, and uses the accumulated information to generate a fourth dividing line 41 which is a dividing line obtained by extending the recognized dividing line 30B rearward of the own vehicle (hereinafter, the fourth dividing line generated by extending the recognized dividing line rearward is referred to as a history dividing line).

The trajectory dividing line generation unit 110 generates a trajectory dividing line 60 extending rearward of the vehicle 10 using the recognized dividing line 30B and the traveling trajectory 50 of the other vehicle 12. The output dividing line construction unit 111 uses the history dividing line 41 and the trajectory dividing line 60 to construct, behind the vehicle 10, an output dividing line that is a boundary between an own lane on which the own vehicle is traveling and an adjacent lane adjacent to the own lane. The dividing line information utilization device 500 uses the information on the output dividing line behind the own vehicle constructed by the output dividing line construction unit 111 to determine whether the traveling lane of another vehicle traveling behind the vehicle 10 is the own lane or the adjacent lane.

The entire processing flow is positioned between the recognized dividing line generation in the processing P4 and the extended dividing line generation in the processing P5 in FIG. 3.

Figure 12:
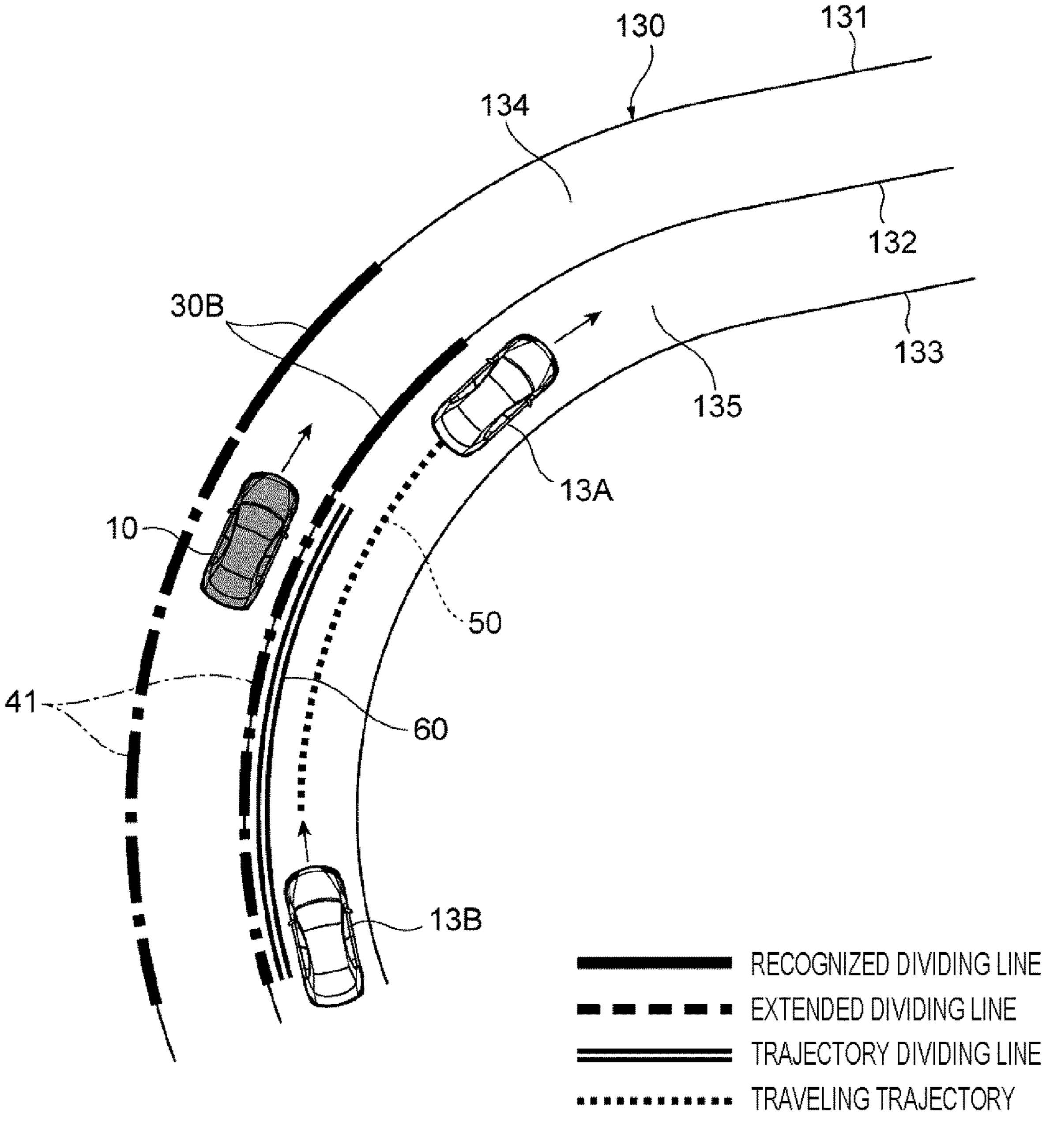
FIG. 12 is an image diagram of the second embodiment in a case where another vehicle is traveling in the front-rear direction of the own vehicle.

As description of the utilization scene with reference to FIG. 12, a scene in which a vehicle 13A is traveling in front of the vehicle 10 and a vehicle 13B is approaching behind the vehicle is considered. FIG. 12 illustrates an example in which three dividing lines 131, 132, and 133 are drawn as dividing lines 130 that divide two lanes, the vehicle 10 that is an own vehicle travels on a lane 134 between the dividing line 131 and the dividing line 132, and other vehicles 13A and 13B travel on a lane 135 between the dividing line 132 and the dividing line 133.

Similarly to the first embodiment, although the vehicle 10 detects part of the front dividing line to form the recognized dividing line 30B, the history accumulation unit 112 can generate the history dividing line 41 up to the rear of the vehicle 10. Then, the trajectory dividing line 60 extending rearward of the own vehicle can be obtained on the basis of the recognized dividing line 30B and the traveling trajectory 50 of the other vehicle 13A. Then, in a case where a distance between both the history dividing line 41 and the trajectory dividing line 60 is equal to or less than a threshold, it is possible to generate an output dividing line having medium reliability information. Thus, the dividing line information utilization device 500 can determine whether the lane on which the following other vehicle 13B is traveling is the own lane 134 or the adjacent lane 135 on the basis of the output dividing line having the medium reliability information. In other words, it can be used for danger determination when the vehicle 10 executes lane change. Here, as the output dividing line having the medium reliability information, the history dividing line generated from the history of the actually detected dividing line is assumed to be more reliable than the trajectory dividing line, and thus, the history dividing line may be adopted, or an integrated dividing line in which both dividing lines are integrated may be adopted.

Third Embodiment

Figure 13:
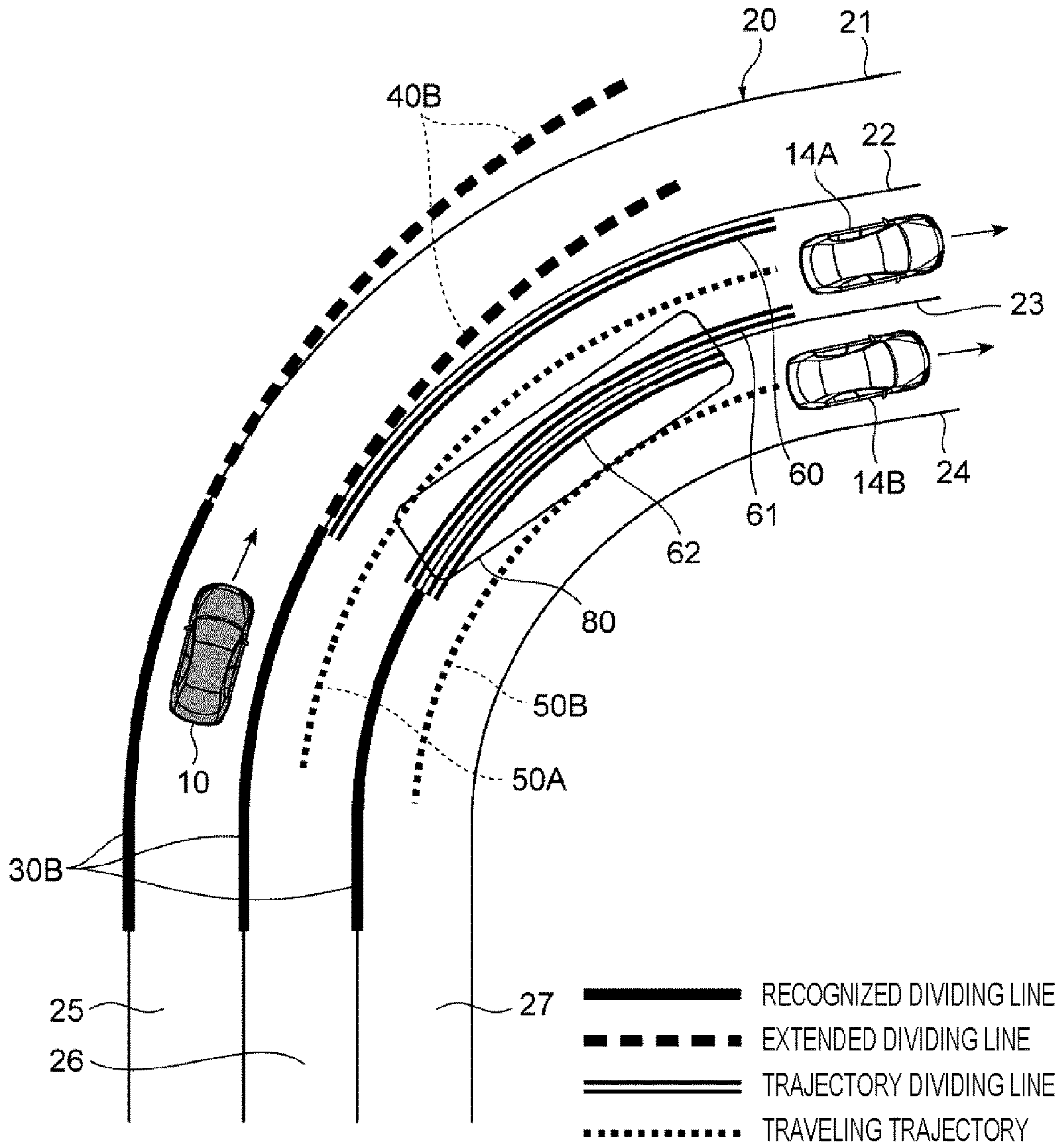
FIG. 13 is an image diagram of a third embodiment in a case where a plurality of other vehicles are traveling.

A block configuration of a third embodiment illustrated in FIG. 13 is the same as that of the first embodiment, but a plurality of other vehicles are targeted, and thus, the dividing line information integration device 100 adds an item to be combined in the dividing line selecting processing of the output dividing line construction unit 111.

FIG. 13 is a scene in which a plurality of other vehicles 14A and 14B are traveling in front of the vehicle 10. As in the first embodiment, the vehicle 10 is mounted with the dividing line detection sensor 200, the target detection sensor 300, and the like, and can detect surrounding dividing lines and targets. It is assumed that the dividing line detection sensor 200 can detect not only the own lane 25 but also the dividing lines 23 and 24 of the adjacent lanes 26 and 27. Trajectory dividing lines 60 and 61 are generated on the basis of a traveling trajectory 50A and a recognized dividing line 30B of the other vehicle 14A, and a trajectory dividing line 62 is generated on the basis of a traveling trajectory 50B and a recognized dividing line 30B of the other vehicle 14B.

The dividing line information integration device 100 can estimate the dividing line of a section 80 where the trajectory dividing lines 61 and 62 overlap each other from the traveling trajectories 50A and 50B of the other vehicles 14A and 14B. In a case where a plurality of trajectory dividing lines are compared with each other and adjacent trajectory dividing sections have a distance equal to or less than a threshold, the trajectory dividing line generation unit 110 adopts any one of the plurality of trajectory dividing lines or an integrated dividing line obtained by integrating the plurality of trajectory dividing lines, as the trajectory dividing line. In a case where the trajectory dividing lines 61 and 62 in the section 80 have a distance equal to or less than the threshold, medium reliability information is given because a plurality of dividing lines are superimposed, and one of the trajectory dividing lines is adopted as the reliability order. Alternatively, similarly to FIG. 7, an integrated dividing line in which a plurality of dividing lines are integrated may be adopted. This makes it possible to perform lane change to the adjacent lane or capture a plurality of lanes around the own vehicle, so that it is possible to improve a possibility of matching with the lane described in the map.

Although the embodiments of the present invention have been described in detail above, the present invention is not limited to the above embodiments, and various design changes can be made without departing from the spirit of the present invention described in the claims. For example, the above-described embodiments have been described in detail for easy understanding of the present invention, and the present invention is not necessarily limited to those having all the described configurations. In addition, part of the components of a certain embodiment can be replaced with the components of another embodiment, and the components of another embodiment can be added to the configuration of a certain embodiment. In addition, it is possible to make addition, deletion, and replacement concerning part of the components of each embodiment.

REFERENCE SIGNS LIST

- 30B recognized dividing line (first dividing line)
- 40 extended dividing line (second dividing line)
- 41 history dividing line (fourth dividing line)
- 60 trajectory dividing line (third dividing line)
- 100 dividing line information integration device (dividing line recognition device)
- 102 dividing line recognition unit (first dividing line generation unit)
- 104 other vehicle state estimation unit
- 106 self-position/posture estimation unit

108 extended dividing line generation unit (second dividing line generation unit)

110 trajectory dividing line generation unit (third dividing line generation unit)

111 output dividing line construction unit

112 history accumulation unit

The invention claimed is:

1. A dividing line recognition device comprising a controller configured to:

acquire dividing line information around an own vehicle detected by a dividing line detection sensor mounted on the own vehicle;

acquire target information around the own vehicle detected by a target detection sensor mounted on the own vehicle;

estimate a state of another vehicle on a basis of the target information;

recognize a dividing line from the dividing line information and generate the recognized dividing line as a first dividing line;

estimate a dividing line by extending the first dividing line and generate the estimated dividing line as a second dividing line;

estimate a dividing line on a basis of a positional relationship between a traveling trajectory of the other vehicle and the first dividing line, wherein estimating the dividing line includes measuring a lane-width-direction distance between the traveling trajectory of the other vehicle and the first dividing line, calculating an offset value based on the measured distance, and laterally shifting the travelling trajectory by the offset value, and generate the estimated dividing line as a third dividing line; and construct an output dividing line to be output as a dividing line using at least one of the first dividing line, the second dividing line, or the third dividing line.

2. The dividing line recognition device according to claim 1, wherein the controller is further configured to divide each of the first dividing line, the second dividing line, and the third dividing line into a plurality of sections and selects one of the first dividing line, the second dividing line, and the third dividing line as a dividing line in each section on a basis of reliability.

3. The dividing line recognition device according to claim 2, wherein the controller is further configured to add reliability information to each of information on the first dividing line, information on the second dividing line, and information on the third dividing line and selects a dividing line having high reliability as a dividing line in each section among the first dividing line, the second dividing line, and the third dividing line.

4. The dividing line recognition device according to claim 1, wherein the controller is further configured to:

acquire positioning information detected by a positioning sensor mounted on the own vehicle;

estimate a position/posture of the own vehicle on a basis of the positioning information;

accumulate the position/posture of the own vehicle and information on the first dividing line as a history and generate a fourth dividing line obtained by extending the first dividing line rearward of the own vehicle; and use the third dividing line and the fourth dividing line to construct, behind the own vehicle, an output dividing line that is a boundary between an own lane on which the own vehicle is traveling and an adjacent lane adjacent to the own lane.

5. The dividing line recognition device according to claim 1, wherein the controller is further configured to:

estimate states of a plurality of other vehicles around the own vehicle, estimate a plurality of third dividing lines on a basis of a positional relationship between the first dividing line and a traveling trajectory of each of the plurality of other vehicles, and construct an output dividing line to be output as a dividing line using at least one of the first dividing line, the second dividing line, or the plurality of third dividing lines.

6. The dividing line recognition device according to claim 5, wherein in a case where the plurality of third dividing lines are compared with each other and adjacent third sections have a distance equal to or less than a threshold, the controller is further configured to adopt any one of the plurality of third dividing lines or a dividing line obtained by integrating the plurality of third dividing lines, as the third dividing line.

7. A vehicle control device that determines whether a traveling lane of another vehicle traveling behind the own vehicle is the own lane or the adjacent lane by using information on the output dividing line behind the own vehicle constructed by the dividing line recognition device according to claim 4.

* * * * *